United States Patent Office 3,328,354
Patented June 27, 1967

3,328,354
PHENOL-RESORCINOL-FORMALDEHYDE RESINS AND THE PROCESS OF MAKING THEM, USING AN ALKALI METAL SULFITE CATALYST
Myron I. Dietrick, East Brady, Pa., assignor to Koppers Company, Inc., a corporation of Delaware
No Drawing. Filed June 4, 1964, Ser. No. 372,676
5 Claims. (Cl. 260—54)

This invention relates to novel phenol-resorcinol-formaldehyde resins and to superior adhesives prepared therefrom.

Phenolic resin adhesives are well known for their exceptional strength and durability. Resins for use in such adhesives are commonly prepared by the alkaline condensation of formaldehyde with phenol, resorcinol or combinations of the two. The use of ammonia and amines as condensation catalysts has been common practice.

Resorcinol is the only polyhydric phenol used directly in the preparation of resin adhesives to any significant extent. Of the phenolic resins, only those containing resorcinol are commercially important for adhesive applications requiring room temperature setting or curing. The resorcinol-containing adhesives also have the advantage of being waterproof and durable. However, because of its cost, the use of resorcinol has been restricted for many applications. As a compromise between cost and performance a resorcinol modified phenol-formaldehyde resin has been developed.

Conventionally, the preparation of a resorcinol-modified phenol-formaldehyde adhesive involves forming a solution of a water-soluble, fusible phenol-resorcinol-formaldehyde resin and making an adhesive mix therefrom by adding to the resin solution a methylene donor which acts to cure the resin to a cross-linked, insoluble, infusible state. Common methylene donors or hardeners are aqueous formaldehyde, paraformaldehyde, hexamethylenetetramine and the like. In addition to hardeners, the adhesive mix generally contains fillers, i.e., inert materials added to increase the weight of the mix; and extenders, i.e., inert materials which lessen the cost without reducing the valuable properties of the adhesive. Common extenders include walnut shell flour, wood flour, bark flour, asbestos and cellulosic fibers. The curing time of a particular adhesive mix is often adjusted with a catalyst or modifier.

The gluing viscosity of a particular adhesive mix and the operable limit of resin solids content are influenced considerably by the technique used to prepare the resins.

The process used to prepare the resin also has a marked effect on storability, that is, the storage life of the resin before it is mixed with the hardener or setting agent. One disadvantage of some phenolic resins is the relatively short storage life, e.g., many phenolic resins used for formulating adhesives have a storage life of less than about three months. Storage instability is reflected by poor dilutability, i.e., the ability of the resin to be mixed with water without precipitation. Excellent resins are infinitely dilutable with water. Resins which are not infinitely dilutable provide adhesives which have poor washability; in other words such resins cannot be washed with water (before curing) from gluing equipment.

Proper pot life or gel time is a major problem in the formulation of adhesive mixes from phenol-resorcinol-formaldehyde resins. Many reactive resins, which would be otherwise desirable, cause the adhesive mix to gel too rapidly for practical commercial use, because the quick gelation affords no reasonable time for open and closed assembly of the members to be bonded. Long open and closed assembly times are particularly necessary when a large number of laminates or complex structures such as curved members are to be bonded by the adhesive. Efforts to retard gelation of the adhesive mix have resulted in destroying the reactivity of the resin to the extent that the curing of the adhesive is unreasonably prolonged.

Substantially all phenol-resorcinol-formaldehyde resin adhesives heretofore known have been subject to odor problems arising from either the presence of unreacted phenol or from the evolution of free formaldehyde. The excessive odors arising from the free phenol and free formaldehyde of the resin have made such adhesives particularly difficult and unsafe to work with during open assembly of members to be bonded.

A well-known method for making a phenol-resorcinol-formaldehyde adhesive is described in Spahr et al., U.S. Patent 2,489,336. According to Spahr et al., a water soluble phenol-resorcinol-formaldehyde resin is made by reacting one mole of phenol with 1-2.5 moles of formaldehyde in an aqueous caustic soda solution and adding thereto at a temperature of 25-70° resorcinol together with sufficient non-volatile alkali to maintain the pH at between about 9 and 13. The reaction mixture is then condensed by heating until the resulting product has a viscosity between about 30 and 200 r.p.m. as determined on a Stormer viscosimeter at 70° F. using a 500 g. weight. The amount of resorcinol added is between about 1.1 to 10 parts for each ten parts of phenol. When using polyoxymethylene as a hardening agent to formulate an adhesive, the resulting product tends to gel in about 10 minutes at a temperature of 73° F. Thus, this adhesive cannot be used when a long pot life is required such as when bonding together a large number of laminated boards.

Another useful phenol-resorcinol-formaldehyde resin is described in Spahr U.S. Patent 2,614,096. This patent describes a method of making a water-soluble phenol-resorcinol-formaldehyde resin by refluxing a mixture of one mole of phenol with 1.3 to 2.5 moles of formaldehyde in an aqeous solution at a pH of 7.5 to 8.8 in the presence of a non-volatile alkaline catalyst. Refluxing is continued until the reaction product contains less than two percent free formaldehyde and tolerates the addition of 0.1 to 5 volumes of water without causing the resultant solution to become cloudy at 70° F. The product is refluxed with 10-150 parts of resorcinol for each 100 parts phenol at a temperature not exceeding 100° C. until the resin has a viscosity of 0.5 to 1.65 poises at a solids content between 40 and 60 percent. Unfortunately, this resin tends to be unstable at temperatures of about 110° F. and, when combined with the recommended hardener, the resulting contains sufficient amounts of free formaldehyde and phenol to produce an unpleasant and noxious odor. In addition, the resin lacks infinite dilutability; thus it provides adhesives having poor washability.

I have discovered a resorcinol-phenol-formaldehyde resin which, quite surprisingly, can be used to formulate an adhesive having a long pot life of 200-300 minutes and even up to 400 minutes, thus providing long open and closed assembly times. Unexpectedly, my novel adhesives cure rapidly (within four hours) at relatively low temperatures of 70-110° F. Other important features of adhesives made from the novel resins are those of excellent washability, which permit easy removal of the adhesive from the gluing equipment after use, very low phenol or formaldehyde odor, and excellent bonding characteristics with soft and dense woods.

It is therefore an object of the present invention to provide a novel highly reactive, storage-stable phenol-resorcinol-formaldehyde resin, which, in solution, is infinitely dilutable with water. It is a further object to provide a low odor, rapid-curing phenol-rescorcinol-formaldehyde resin adhesive having excellent washability, long pot life and excellent bonding characteristics both with respect to wood failure and delamination.

In accordance with the invention, I have discovered a water-soluble, fusible phenol-resorcinol-formaldehyde resin having a composition comprising 50–95 moles phenol and 5–50 moles resorcinol per 100 moles of total phenolic compound and 0.55 to 0.75 mole of formaldehyde for each mole total phenolic compound. The resin is made by reacting phenol and all of the formaldehydes at an initial pH of 8.5 to 9.0 in the presence of an alkali metal sulfite catalyst in an amount of 0.04 to 0.09 mole per mole of formaldehyde and refluxing the reaction mixture until the mixture has attained a viscosity of 4.7 to 8.8 poises. Resorcinol is added and the refluxing is continued until the resin has a constant viscosity of 22.7 to 46.3 poises. To prepare the resin for use in adhesive formulations, it is diluted with a water miscible solvent to give a solution having a solids content of 40–60 percent by weight and a viscosity of 3.6 to 4.3 poises.

The phenol-resorcinol-formaldehyde resin solution is mixed with paraformaldehyde or paraformaldehyde in one of its higher polymeric forms at a pH of 7.5–8.5 along with conventional fillers and extenders as desired to give the novel adhesive.

The respective mole ratios of the phenolic compounds, that is the ratio of phenol to resorcinol varies from 50–95 moles of phenol to 5–50 moles resorcinol per 100 moles of total phenolic compound. The resorcinol serves to enhance the reactivity of the resin. It is therefore necessary to have a minimum of about five percent resorcinol present. When the resin contains an insufficient amount of resorcinol, the temperature required for curing rises considerably and when the resorcinol is omitted entirely, curing temperatures of 240° F. and higher are required in the absence of a strong catalyst. On the other hand, it is not desirable to use more than the maximum amount of resorcinol since resorcinol is the most expensive component of the resin mixture. Thus to use more than 50 percent resorcinol for an adhesive having a solids content of 40–60 percent would be economically unsatisfactory for many applications.

The mole ratio of formaldehyde to the total phenolic portion of the resin is 0.55 to 0.75 per mole of phenolic component. If an excess is used, the stability of the resulting resin is impaired, which can adversely affect both pot life and washability of adhesives prepared therefrom. There must of course be a minimum amount of formaldehyde present sufficient to effect substantial condensation of the phenol portion of the resin.

An alkali metal sulfite is required to catalyze the condensation reaction. Usually the amount of alkali metal sulfite catalyst is such as to produce a pH of about 8.5 to 9.0. For convenience, the required amount of sulfite can be determined in terms of the molar ratio of sulfite to formaldehyde, which must be 0.04 to 0.09 mole of sulfite catalyst per mole of formaldehyde. If less than 0.04 mole of sulfite is used there is insufficient catalyst to advance the condensation of the resin to the required degree and adhesives prepared therefrom have poor gluing properties, particularly with respect to delamination. If an amount of sulfite greater than 0.09 mole is used there are undesirable side reactions between the sulfite and the formaldehyde which tend to prevent condensation of the phenol and formaldehyde.

The alkali metal sulfite catalysts useful in the present invention include the sodium, potassium and lithium sulfites. Sodium sulfite, being the most economical and most readily available, is preferred. The bisulfites of the alkali metals are equivalent to sulfites if used in an equivalent amount on an $SO_3$ basis. It has been found that other alkalis such as sodium hydroxide and the like cannot be used to prepare the novel resins of the present invention, as is shown in the comparative examples that follow.

The unique nature of the sulfite catalyst may be explained by the fact that this catalyst, in addition to giving the proper pH, reacts with and complexes the resin. The sulfite catalyst appears to have to some extent a solubilizing affect on the phenol, thus permitting a more complete reaction between the phenol and formaldehyde which contributes to the greater reactivity of the resin and the low phenol odor of the ultimate adhesive.

The general procedure for preparing the novel resin is as follows. Formaldehyde (usually as a 37 percent aqueous solution) is mixed with the alkali metal sulfite catalyst and the mixture is heated to dissolve the catalyst. For ease of operation this is done before the addition of the phenol, although the phenol can be added initially before dissolving the catalyst. The phenol is charged to the reaction mixture with the pH of the mixture being maintained between 8.5 to 9.0 and the reaction mixture is then refluxed until a viscosity of 4.7 to 8.8 poises is obtained. The extent of condensation is conveniently determined by following the viscosity during condensation.

The advancement of the condensation between the phenol and formaldehyde to a viscosty of 4.7–8.8 poises is necessary in order to obtain the unique properties of the resin and resin adhesive of the invention. This high degree of condensation, which is unique in the preparation of phenol-resorcinol-formaldehyde resins, effectively ties up the available phenol, thereby avoiding the odor problems that have plagued the art. Surprisingly, the high degree of phenol condensation (prior to the resorcinol addition) provides an extremely reactive resin which can be formulated into an adhesive having a long pot life as well as rapid curing characteristics. As noted above, the advancement of the phenol-formaldehyde condensation is made possible by the use of the sulfite catalyst.

It is important for purposes of the present invention to complete the advancement of the phenol-formaldehyde portion of the resin to the above indicated viscosity before all of the resorcinol is added. Ordinarily, it is convenient to condense phenol and formaldehyde until the critical viscosity of 4.7–8.8 poises is reached and thereafter add the resorcinol. Excellent resins can also be made by adding the resorcinol continuously or incrementally after the phenol-formaldehyde condensation has been advanced to a viscosity of 1.25 poises. Using continuous or incremental addition at least the last 25 weight percent of the resorcinol could be added after a viscosity of 4.7 poises has been attained. Using the incremental technique, resorcinol is conveniently added in three or four increments. After the addition of resorcinol is complete, refluxing is continued until the reaction mixture reaches a constant viscosity, which is in the range of 22.7 to 46.3 poises.

The viscosity of the resin solution thus prepared is extremely high compared to the normal glue viscosity of adhesive mixes. To make a resin solution useful in adhesive formulations, the resin, prepared as described hereabove, is diluted with water or any water miscible solvent conventional in the adhesive art. Particularly useful are mixed solvents comprising water, lower aliphatic alcohols, and glycols. One typical solvent solution is made up of ethylene glycol, methanol and water in a ratio of 5:20:75 parts by weight. Another useful solvent solution is a mixture of ethylene glycol, ethyl alcohol and water in a ratio of 15:15:70 parts by weight. Ordinarily, the resins of the invention are diluted with one of these solvent systems to a viscosity of 3.4 to 4.3 poises.

The resins of the invention are characterized by infinite dilutability; i.e., they can be diluted with an infinite amount of water without any clouding or precipitation. This dilutability characteristic is extremely important in evaluating the usefulness of a particular phenol-resorcinol-formaldehyde resin. Those resins which, after their preparation, show clouding or precipitation upon addition of less than three equal volume proportions of water and a stability of only one to three months on storage are unacceptable. The resins of the invention, with their infinite dilutability, are storage stable for nine months or more.

The degree of dilutability also is a measure of the washability of the ultimate adhesive. Resins, such as that of the present invention, which are infinitely dilutable are easily washed from the gluing equipment after assembly has been completed.

The adhesive of the invention is prepared by mixing the resin solution, adjusted to the desired viscosity as described hereinabove, with paraformaldehyde hardener at a pH of 7.5–8.5 along with suitable fillers and extenders if desired.

In order to provide the long pot life characteristic of the adhesive of the invention, it is necessary to use as a setting agent paraformaldehyde, either as such, or as one of its higher polymers commonly referred to as alpha-polyoxymethylene and beta-polyoxymethylene. The higher polymers of paraformaldehyde are easily prepared by heating paraformaldehyde to a temperature of approximately 100° C., preferably in the presence of an acid catalyst, such as oxalic acid or a Lewis acid. The paraformaldehyde or polyoxymethylene is added to the adhesive mix in an amount sufficient to convert the resin into a water-insoluble, infusible state. The minimum amount required is that sufficient to provide a total formaldehyde (including that initially condensed with the resin) to total phenolic compound mole ratio of greater than 1:1, preferably in the range of 1.3 to 2 moles of total formaldehyde to one mole of total phenolic compound.

The paraformaldehyde is conveniently added as a hardener portion of the adhesive mix along with the conventional extenders and fillers, such as walnut shell flour, wood flour, and the like. Prior to the addition of the hardener portion, the pH of the adhesive mix is adjusted to 7.5 to 8.5, preferably by the addition of 50 percent aqueous caustic. If the pH of the adhesive mix is less than 7.5, the rapid curing characteristics are not attained. If the pH is greater than 8.5, the pot life of the adhesive is drastically reduced.

The bonding characteristics of phenol-resorcinol-formaldehyde resins and adhesives are conventionally evaluated by a compression shear test (ASTM-D-905) and a vacuum pressure delamination test (MIL-A-397B). The numerical results of these tests depend upon the type of wood to be bonded. On Douglas fir compression sheer tests of bonds made using the adhesive of the invention show 85–90 percent wood failure. The wood failure on Southern pine is 70–85 percent. In both cases these results are considered to be excellent. The bond provided by the adhesives of the invention shows, according to the vacuum pressure delamination test, less than one percent delamination for Douglas fir and less than five percent delamination for Southern pine.

My invention is further illustrated by the following examples:

*Example I*

A phenol-resorcinol-formaldehyde resin was prepared according to the following charge schedule:

| Charge | Moles | Pounds |
|---|---|---|
| Formaldehyde (37%) | 16.80 | 1,371.4 |
| Sodium Sulfite | 1.344 | 169.4 |
| Phenol (90%) | 21.0 | 2,193.0 |
| Resorcinol, Tech | 7.0 | 770.0 |
|  |  | 4,503.8 |

The ingredients were added in the following mole ratios:

Ingredients:                              Mole ratio
    Phenol:resorcinol:formaldehyde _____ 75:25:60
    Formaldehyde:sodium sulfite _____ 1:8.080

Formaldehyde was charged to a 1000 gallon kettle, fitted with a pump for agitation, to which the sodium sulfite was gradually added. The agitation was commenced and the mixture was maintained at a temperature of about 30° C. for thirty minutes. The phenol was charged to the reactor and the pH was determined and found to be 8.9. The mixture was heated to reflux and at various stages at approximately 15 minute intervals the viscosity changes were noted and refluxing was continued until the viscosity was in a range of R on a Gardner bubble-tube viscosimeter (4.7 poises). The mixture was cooled to 80° C. and resorcinol was added thereto. The mixture was then heated to reflux, which was continued until a constant viscosity was obtained over a period of ninety minutes which was at a viscosity of Z (22.7 poises). The reaction mixture was cooled and diluted with a solvent mixture of 15 parts of ethylene glycol, 15 parts ethyl alcohol and 70 parts water to a viscosity of N-O (3.4–3.7 poises) and adjusted to a pH of 8.0 with a fifty percent caustic soda solution.

The resin was then treated with a setting agent comprised of heat-treated paraformaldehyde (polyoxymethylene), 46.35 parts; wood flour, 8.20 parts; and walnut shell flour, 45.45 parts. Prior to being used in the setting agent, the paraformaldehyde was treated with colloidal silica and oxalic acid at a temperature of 100–104° C. under reduced pressure to form a polyoxymethylene. Various polyoxymethylenes which can be used in the setting agent are described by Charlton Ellis in "The Chemistry of Synthetic Resin," New York, 1935, pages 511–516. The gel time for the adhesive was found to be in a range of 380–400 minutes.

The adhesive prepared by the above procedure had a pH of 8.02; a viscosity of 3.7 poises; a solids content of 52.5 percent; infinite dilutability and a gel time of 390 minutes at 73° F. It was further characterized as having a low phenol and low formaldehyde odor, excellent washability and excellent bonding properties as shown in the table below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,710 | 90 | 4.4 |
| Douglas Fir | 1,425 | 85 | 0.9 |

*Example II*

Following the procedure of Example I, with the exception that the resorcinol was added in three increments during the condensation reaction, a resin was prepared according to the following formulation:

| Charge | Moles | Pounds |
|---|---|---|
| Formaldehyde (36.9%) | 31.05 | 2,524.0 |
| Sodium Sulfite | 2.156 | 272.0 |
| Phenol USP (90%) | 35.00 | 3,655.6 |
| Resorcinol, Tech | 15.00 | 1,650.0 |
|  |  | 8,101.6 |

The ingredients were added in the following mole ratios:

Ingredients:                              Mole ratio
    Phenol:resorcinol:formaldehyde _____ 70:30:62.1
    Formaldehyde:sodium sulfite _____ 1:0.0694

The procedure of Example I was modified such that after the formaldehyde, sodium sulfite and the phenol were added to the reactor and heated to reflux, the first charge of resorcinol was added at a viscosity of E on a Gardner bubble-tube viscosimeter (1.25 poises). Thereafter the second charge of resorcinol was added to the reactor at a viscosity of M (3.2 poises) and finally the third charge of resorcinol was added at a viscosity of T (5.5 poises). The refluxing was continued until the viscosity remained constant over a period of 90 minutes at a viscosity of $Z_1$ (27.0 poises). The resin was diluted to a viscosity of K-L (2.75–3.0 poises) with a solvent of ethylene glycol, methanol and water in a ratio of 5:20:75 parts by weight.

The resin was then cured with the setting agent prepared in Example I to give an adhesive having a pH of 9.1; a viscosity of 3.0 poises; infinite dilutability; a solids content of 51%; and a gel time of 385 minutes at 73° F. It was further characterized as having a low phenol and low formaldehyde odor, excellent washability and excellent bonding properties as shown in the table below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,560 | 80 | 0.7 |
| Douglas Fir | 1,410 | 95 | 0.5 |

Example III

Following the procedure of Example I, a resin was prepared according to the following formulation:

| Charge | Moles | Pounds |
|---|---|---|
| Phenol (90%) | 2.3778 | 248.34 |
| Formaldehyde (36.2%) | 1.84 | 151.60 |
| Resorcinol Tech | 0.5952 | 65.47 |
| Sodium Sulfite | 0.1596 | 20.13 |

The ingredients were added in the following mole ratios:

Ingredients:                                    Mole ratio
    Phenol:resorcinol:formaldehyde _____ 80:20:62
    Formaldehyde:sodium sulfite _____ 1:0.0867

Formaldehyde was charged to a 100 gallon kettle equipped with a pump to recirculate the contents. The temperature was maintained at 25–30° C. Sodium sulfite was added over a period of approximately 30 minutes, after which the phenol was charged and mixing continued for 30 minutes. The mixture was heated to reflux and the pH determined as being 8.9. Heating was continued at reflux to a Gardner-Holdt viscosity of Z (22.7 poises). The mixture was cooled to 80° C., resorcinol was added and heating continued. The mixture was reacted at reflux until the viscosity did not change over a period of one-two hours. The reaction mixture was diluted with 80:20 ethylene glycol:water solvent system to a Gardner-Holdt viscosity of N-O (3.4–3.7 poises). The pH was adjusted to give the desired reactivity with the polyoxymethylene setting agent of Example I.

The resin was then cured with the setting agent prepared in Example I to give an adhesive having a pH of 8.0; a viscosity of 5.0 poises; infinite dilutability; a solids content of 43.6%; and a gel time of 370 minutes at 73° F. It was further characterized as having a low phenol and low formaldehyde odor, excellent washability and excellent bonding properties as shown in the table below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,665 | 90 | 0.8 |
| Douglas Fir | 1,275 | 90 | 1.0 |

Example IV

An excellent resin, suitable for a plywood adhesive formulation is made according to the procedure of Example III by adjusting the phenol:resorcinol mole ratio to 95:5.

Example V

An excellent resin, suitable for making an adhesive of extremely high wet strength, is made according to the procedure of Example III by adjusting the phenol:resorcinol mole ratio to 50:50.

Example VI

A resin solution was prepared according to the teachings of Spahr, U.S. 2,489,336, using a caustic soda catalyst and hardened with a polyoxymethylene setting agent.

Following the procedure of Example I of the Spahr, 4405 g. of phenol, 3445 g. of formaldehyde, 555 g. of caustic soda flakes and 545 g. of water were charged to a jacketed kettle equipped with a stirring device and a reflux condensor. The mixture was refluxed until the viscosity of the solution reached C-D on the Gardner bubble-tube viscosimeter for a period of forty minutes. The batch was then cooled to 85° C. and the solution maintained at this temperature until the viscosity reached H, at which point it was cooled to 80° C. After the viscosity reached J, the batch was cooled to 40° C. and 1547 g. of resorcinol, 433 g. of caustic soda flakes and 2400 g. of water were added. The solution was then heated to 80° C. The batch was condensed to a viscosity of N and then cooled to 75° C. after the batch reached a viscosity of Q, it was cooled to room temperature. The resin was then diluted with a solvent mixture of 15 parts ethylene glycol, 15 parts ethyl alcohol and 70 parts water.

The finished resin solution, which had a viscosity of M, was treated with the polyoxymethylene setting agent used in Example I. At a temperature of 70° F., the adhesive gelled in ten mintues. While this adhesive may be used for applications which require extremely short setting time, it is inadequate for most purposes where a longer setting time is required.

Example VII

Following the procedure of Example VI an attempt was made to substitute sodium sulfite for the caustic soda of Spahr Patent U.S. 2,489,336.

A three-liter vessel was charged with formaldehyde 3445 g., sodium sulfite 1750 g., phenol 4405 g., and water 545 g. and the reaction condensed until the viscosity reached J on the Gardner bubble-tube viscosimeter. Then resorcinol 1547 g., sodium sulfite 1370 g., and water 2400 g., were charged to the reactor. Refluxing was continued over a period of six hours. However, the viscosity remained at B-C on the viscosimeter without advancing further. The reaction was then stopped since there was no indication that the viscosity would further advance.

This experiment shows that sodium sulfite cannot be substituted for the caustic soda in accordance with the teachings of the Spahr patent.

Example VIII

A resin solution was prepared according to the teachings of Spahr, U.S. Patent 2,614,096. This resin was prepared generally according to Example I of the Spahr patent using a sodium hydroxide catalyst wherein the mole ratios of the reactants are 75 moles phenol to 25 moles resorcinol to 97.5 moles formaldehyde and the mole ratio of formaldehyde to sodium hydroxide is 1 to 0.061.

The resin obtained had a pH of 7.8, a viscosity of 8.00 poises and 63 percent solids content. The resin was diluted with 6.1 parts per 100 parts devolatized resin of a solvent mixture of 15 parts of ethylene glycol, 15 parts ethyl alcohol and 70 parts of water. The resin solution was unstable at a temperature of 110° F. and gelled.

When combined with the polyoxymethylene setting agent of Example I, the resulting adhesive had poor bonding characteristics as shown below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,360 | 50 | 20.2 |
| Douglas Fir | 1,175 | 80 | 3.9 |

*Example IX*

Following the procedure of Example VIII with the exception that sodium sulfite catalyst was substituted for the sodium hydroxide, the mole ratios phenol to resorcinol to formaldehyde was 75 to 25 to 97.5 respectively and the mole ratio of formaldehyde to sodium sulfite was 1 to 0.061.

The resin obtained had a viscosity of 7.2 poises. It was diluted with a solvent mixture of 15 parts ethylene glycol, 15 parts ethyl alcohol, and 70 parts water. The resin solution was unstable at a temperature of 110° F. when the resin solution was combined with the polyoxymethylene setting agent of Example I, the resulting adhesive had poor bonding characteristics as shown below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,275 | 40 | 87.3 |
| Douglas Fir | 1,280 | 75 | 78.6 |

*Example X*

Following the procedure of Example IX with the exception that the mole ratio of phenol to resorcinol to formaldehyde was changed to 75 to 25 to 60. Using the same amount of sodium sulfite catalyst, the mole ratio of formaldehyde to sodium sulfite was calculated as 1:0.099.

The resin solution was stable. When the resin was combined with the polyoxymethylene setting agent of Example I, the resulting adhesive had poor bonding characteristics as shown below.

|  | Shear Strength ASTM D-905 | | Vacuum Pressure Delamination, Percent MIL-A-397B |
|---|---|---|---|
|  | P.s.i. | Percent Wood Failure |  |
| Southern Pine | 1,265 | 65 | 56.5 |
| Douglas Fir | 1,180 | 85 | 47.8 |

*Example XI*

An excellent adhesive is made from the resin solution of Example I that is cured with paraformaldehyde setting agent. While the adhesive is comparable to the adhesive prepared according to Example I in having a low phenol and low formaldehyde odor, excellent washability and excellent bonding properties, the paraformaldehyde setting agent accelerates the gel time of the adhesive to 200-250 minutes at 73° F.

*Example XII*

To determine the effect of the sodium sulfite catalyst on the initial pH of the reaction mixture containing 75 parts of phenol and 60 parts of formaldehyde the following mixes were prepared in which the phenol and formaldehyde were kept constant and the amount of sodium sulfite catalyst was varied. The mole ratios of formaldehyde to sulfite and the corresponding pHs are given in the table below.

| Formaldehyde:sulfite: | pH |
|---|---|
| 1:0.040 | 8.5 |
| 1:0.0578 | 8.67 |
| 1:0.0639 | 8.74 |
| 1:0.080 | 8.90 |
| 1:0.0935 | 9.08 |

For the condensation reaction it is necessary that the pH be 8.5–9.0. Using the table above the pH can readily be converted into mole ratios of formaldehyde to sodium sulfite. Thus the pH 8.5–9.0 corresponds to a mole ratio of formaldehyde to sodium sulfite of from 1:0.04 to 1:0.09. If less than 0.04 mole of sulfite is used, there is insufficient catalyst present to advance the condensation of the resin to the required degree and the adhesive prepared therefrom has poor bonding properties. If an amount greater than 0.09 mole is used an undesirable side reaction occurs between the sulfite and the formaldehyde which tends to prevent condensation between the phenol and the formaldehyde.

*Example XIII*

Attempts were made to prepare a phenol-resorcinol-formaldehyde resin according to the procedure of Example I with the exception that sodium hydroxide was substituted for sodium sulfite.

The ingredients were added in the following mole ratios.

| Ingredients: | Mole ratio |
|---|---|
| Phenol:resorcinol:formaldehyde | 75:25:62 |
| Formaldehyde:sodium hydroxide | 1:0.05 |

After the formaldehyde, sodium hydroxide (50% aqueous solution) and phenol were charged to the reactor, the pH was found to be 8.5. Refluxing was continued for a period of 6 hours. The partially condensed mass obtained was not dilutable and formed two phases. Upon the addition of resorcinol a gel-like mass developed which was discarded.

This experiment indicates that sodium hydroxide cannot be substituted for the sodium sulfite catalyst in the preparation of the novel adhesive resin.

I claim:
1. A method of making a soluble, fusible phenol-resorcinol-formaldehyde resin solution, characterized by infinite dilutability, which resin comprises 50–95 moles phenol with 5–50 moles resorcinol per 100 moles of total phenol and resorcinol and 0.55–0.75 mole of formaldehyde for each mole total phenol and resorcinol, said resin being prepared by the steps comprising:
   (a) reacting said phenol and said formaldehyde at an initial pH of 8.5–9.0 and in the presence of a sodium sulfite catalyst in an amount of 0.04–0.09 mole per mole of formaldehyde;
   (b) heating the reaction mixture to reflux until the mixture has a viscosity of at least 4.7–8.8 poises;
   (c) adding said resorcinol and continuing refluxing until the resin has a constant viscosity of 22.7–46.3;
   (d) diluting the resin with a miscible solvent to give a solution having a solids content of 40–60 percent by weight and a viscosity of 3.6–4.3 poises;
   (e) and, if the pH of the resin solution is not already at least 7.5, adjusting the pH of said resin solution to at least 7.5.

2. A method of making a curable phenol-resorcinol-formaldehyde resin, said resin being formed by the condensation reaction of phenol and formaldehyde in the presence of an alkaline catalyst and the addition of resorcinol to the partially condensed phenolic resin which contains 50–95 moles phenol with 5–50 moles resorcinol per 100 parts of total phenol and resorcinol and 0.55–0.75 mole formaldehyde for each mole of total phenol and resorcinol, comprising reacting said phenol with said formaldehyde at an initial pH of 8.5–9.0 and in the presence of an alkali metal sulfite catalyst in an amount of 0.04–0.09 mole per mole of formaldehyde, heating the reaction mixture to reflux to advance the condensation of the resin to a viscosity of 4.7–8.8 poises, making incremental additions of the resorcinol to the reaction mixture after the viscosity has advanced to 1.25 poises and adding the last 25 percent of resorcinol when the viscosity has advanced to at least 4.7–8.8 poises, continuing the refluxing until the resin has a constant viscosity of 22.7–46.3 poises, and, if the pH of the resin solution is not already at least 7.5, adjusting the pH of said resin solution to at least 7.5.

3. A soluble, fusible phenol-resorcinol-formaldehyde resin solution, characterized by infinite dilutability, which comprises 50–95 moles phenol with 5–50 moles resorcinol per 100 moles of total phenol and resorcinol and 0.55–0.75 mole of formaldehyde for each mole total phenol and resorcinol, said resin being prepared by the steps comprising:
   (a) reacting said phenol and said formaldehyde at an initial pH of 8.5–9.0 and in the presence of an alkali metal sulfite catalyst in an amount of 0.04–0.09 mole per mole of formaldehyde;
   (b) heating the reaction mixture to reflux until the mixture has a viscosity of at least 4.7–8.8 poises;
   (c) adding said resorcinol and continuing refluxing until the resin has a constant viscosity of 22.7–46.3 poises;
   (d) and, if the pH of the resin solution is not already at least 7.5, adjusting the pH of said resin solution to at least 7.5.

4. A method of making a phenol-resorcinol-formaldehyde adhesive which comprises a resin solution, characterized by infinite dilutability, of 50–95 moles of total phenol and resorcinol and 0.55–0.75 mole of formaldehyde for each mole total phenol and resorcinol, together with a curing agent, said adhesive being prepared by the steps comprising: reacting said phenol and said formaldehyde at an initial pH of 8.5–9.0 and in the presence of an alkali metal sulfite in an amount of 0.04–0.09 mole per mole of formaldehyde; heating the reaction mixture to reflux until the mixture has a viscosity of at least 4.7–8.8 poises; adding said resorcinol and continuing refluxing until the resin has a constant viscosity of 22.7–46.3 poises; diluting the resin with a water miscible solvent to give a solution having a solids content of 40–60 percent by weight and a viscosity of 3.6–4.3 poises; adjusting the pH of the resin solution to 7.5–8.5; and reacting said resin solution with a curing agent selected from the group consisting of paraformaldehyde and polyoxymethylene to cure the resin to a crosslinked insoluble, infusible state.

5. A method according to claim 4 wherein said alkali metal sulfite is sodium sulfite and said curing agent is polyoxymethylene.

References Cited

FOREIGN PATENTS 963,073  12/1949  France.

OTHER REFERENCES

Chemistry of Phenolic Resins, Martin, 1956, page 160.

WILLIAM H. SHORT, *Primary Examiner.*

H. SCHAIN, *Assistant Examiner.*